US009646017B2

(12) United States Patent
Barajas Gonzalez et al.

(10) Patent No.: US 9,646,017 B2
(45) Date of Patent: May 9, 2017

(54) EFFICIENT VIDEO DATA DEDUPLICATION

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 278 days.

(21) Appl. No.: 14/261,620

(22) Filed: Apr. 25, 2014

(65) Prior Publication Data
US 2015/0309880 A1 Oct. 29, 2015

(51) Int. Cl.
*G06F 17/30* (2006.01)
*H04N 21/4335* (2011.01)
*H04N 21/439* (2011.01)

(52) U.S. Cl.
CPC ... *G06F 17/30156* (2013.01); *H04N 21/4335* (2013.01); *H04N 21/4394* (2013.01)

(58) Field of Classification Search
CPC ......... G06F 17/30781; G06F 17/30802; G06F 17/30047; G06F 17/30026; G06F 17/30787; G06F 17/30784; G06F 17/30156
See application file for complete search history.

(56) References Cited

U.S. PATENT DOCUMENTS

| 8,526,784 | B2 | 9/2013 | Jain et al. | |
|---|---|---|---|---|
| 2005/0262534 | A1* | 11/2005 | Bontempi | H04N 5/76 725/58 |
| 2009/0263014 | A1* | 10/2009 | Zhang | G06F 17/30781 382/165 |
| 2010/0211983 | A1* | 8/2010 | Chou | H04L 47/10 725/93 |
| 2011/0035373 | A1* | 2/2011 | Berg | G06F 17/30787 707/723 |
| 2011/0122255 | A1* | 5/2011 | Haritaoglu | G06K 9/00711 348/180 |
| 2011/0179341 | A1* | 7/2011 | Falls | H03M 7/3086 714/807 |
| 2011/0276567 | A1* | 11/2011 | Asikainen | G06F 17/30743 707/728 |
| 2012/0257626 | A1* | 10/2012 | McGhee | H04L 45/7453 370/392 |
| 2015/0244972 | A1* | 8/2015 | Pulido | H04N 5/91 386/295 |

FOREIGN PATENT DOCUMENTS

EP    2362396 A2    2/2011

OTHER PUBLICATIONS

Katiyar, A. et al., "ViDeDup: An Application-Aware Framework for Video De-duplication", Proceedings of the 3rd USENIX conference on Hot Topics in Storage and File Systems, Jun. 2011.*

* cited by examiner

*Primary Examiner* — William Spieler
(74) *Attorney, Agent, or Firm* — Griffiths & Seaton PLLC

(57) ABSTRACT

Various embodiments for performing video data deduplication by a processor device are provided. An accompanying audio stream of a video stream for a selected data block is analyzed for similarity with a pre-existing data block having a predetermined value representative of a plurality of coordinate points of corresponding video at a certain time.

18 Claims, 5 Drawing Sheets

EFFICIENT VIDEO DATA DEDUPLICATION

BACKGROUND OF THE INVENTION

Field of the Invention

The present invention relates in general computing systems, and more particularly to, various embodiments for effecting video data deduplication in an efficient manner.

Description of the Related Art

Today with modern technology, large volumes of data are storable on disk drives; these drives can exist as a solo entity, or as part of a broader make up within a larger storage environment. Often times when writing to even the smallest environment, single drives, duplicate data is written. These duplicated contents can then be DE-duplicated using standard deduplication techniques so long as specific metrics are met.

SUMMARY OF THE INVENTION

Various deduplication techniques may be used to deduplicate files. For example, the file may be analyzed against an additional file to determine if the file has the same size, name, and contents when analyzed at the block-by-block level. While for files that have a consistent start, finish, and make up this tends to prove exceptional, other file types that are also duplicates tend be unrecognizable by the current deduplication metrics.

One file type specifically difficult to fit to existing practices is that of video files. While these files are prevalent throughout everyday life, they are also synonymous with being large and downright 'bulky." In order for deduplication to truly have a good arena to take part in, the playing field must consist of an abundant amount of files, and of course, they must contain duplicates. Such a playing field exists readily in consumers' homes: that of the modern day DVR. In typical user environments consumers use their DVR to record their television where a common thread emerges. Advertisements occur throughout the recordings and are simply part of the recording whilst that time block is being recorded. The same advertisements generally appear several times a day across multiple channels, and often many times within the same program. Using standard data de-duplication methodologies these entities are virtually unrecognizable. The advertisements have no set start, size, or finish. Accordingly, a current need exists for a video-focused deduplication methodology that improves upon the current state of the art.

Accordingly and in view of the foregoing, various embodiments for video deduplication by a processor device are provided. In one embodiment, by way of example only, a method for video deduplication by a processor device is provided. An accompanying audio stream of a video stream for a selected data block is analyzed for similarity with a pre-existing data block having a predetermined value representative of a plurality of coordinate points of corresponding video at a certain time.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
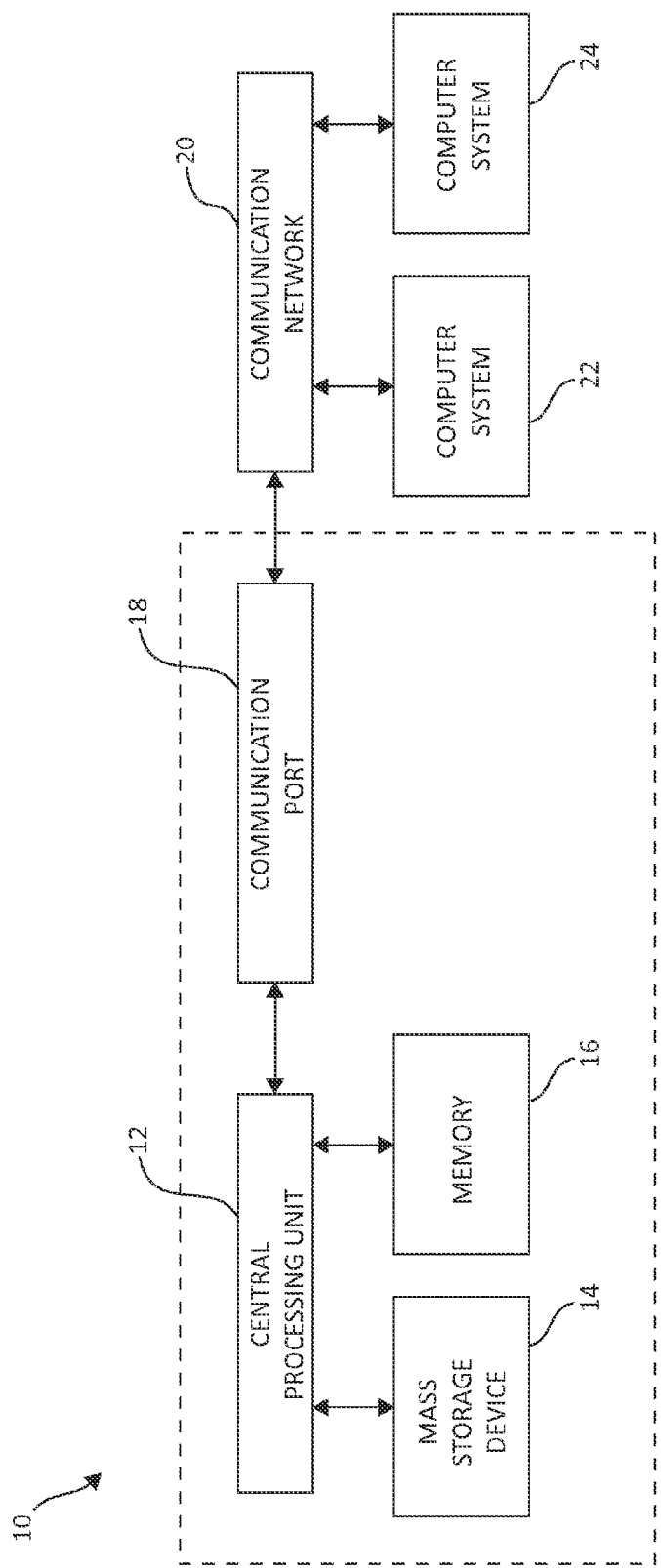
FIG. 1 is an exemplary block diagram showing a hardware structure for performing video data deduplication functionality, in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

Deduplication operations per a given file generation assist in finding identical and/or similar data blocks among the given file generations. However, as previously mentioned, certain challenges arise when deduplicating video files. Home consumers, for example, have duplicate copies of video information that reside in their own personal devices. Notwithstanding this scenario, current deduplication methodologies tend to pass over such files, or require such computing, storage, and other overhead needs as to make implementation of data deduplication functionality in a home consumer setting unworkable. A need exists for a workable deduplication methodology that allows for the implementation of deduplication functionality in locations such as the home consumer level, without incurring excessive resource-consuming overhead.

As such, in one embodiment, a solution to the above is provided in the form of analysis of audio information that typically accompanies video files. As will be further described, the mechanisms of the illustrated embodiments monitor a video stream/videos taken into the system, and generate a unique key value or "base block" that represents a percentage of the data stored on a particular segment of data over time (e.g., 4 s segment).

The mechanisms of the illustrated embodiments do not, for example, store all of the data over the predetermined time frame, but rather specific pixel data from a variety of differing geographical locations on the screen, to allow a high degree of accuracy to identify whether that frame already exists, as well as the audio used in that segment.

When an instant base-block is produced, it is then compared against already established base-blocks for identical matches. One example of this scenario involves video advertising data. Since the nature of stored digital media allows for the media to be sought from multiple points at the same time, video deduplication can occur well before the user is even aware that the content exists later on in a particular video being presented to the user. This allows the mechanisms of the illustrated embodiments to not only identify, but have nonessential video media completely removed from the user's viewing experience.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device (s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
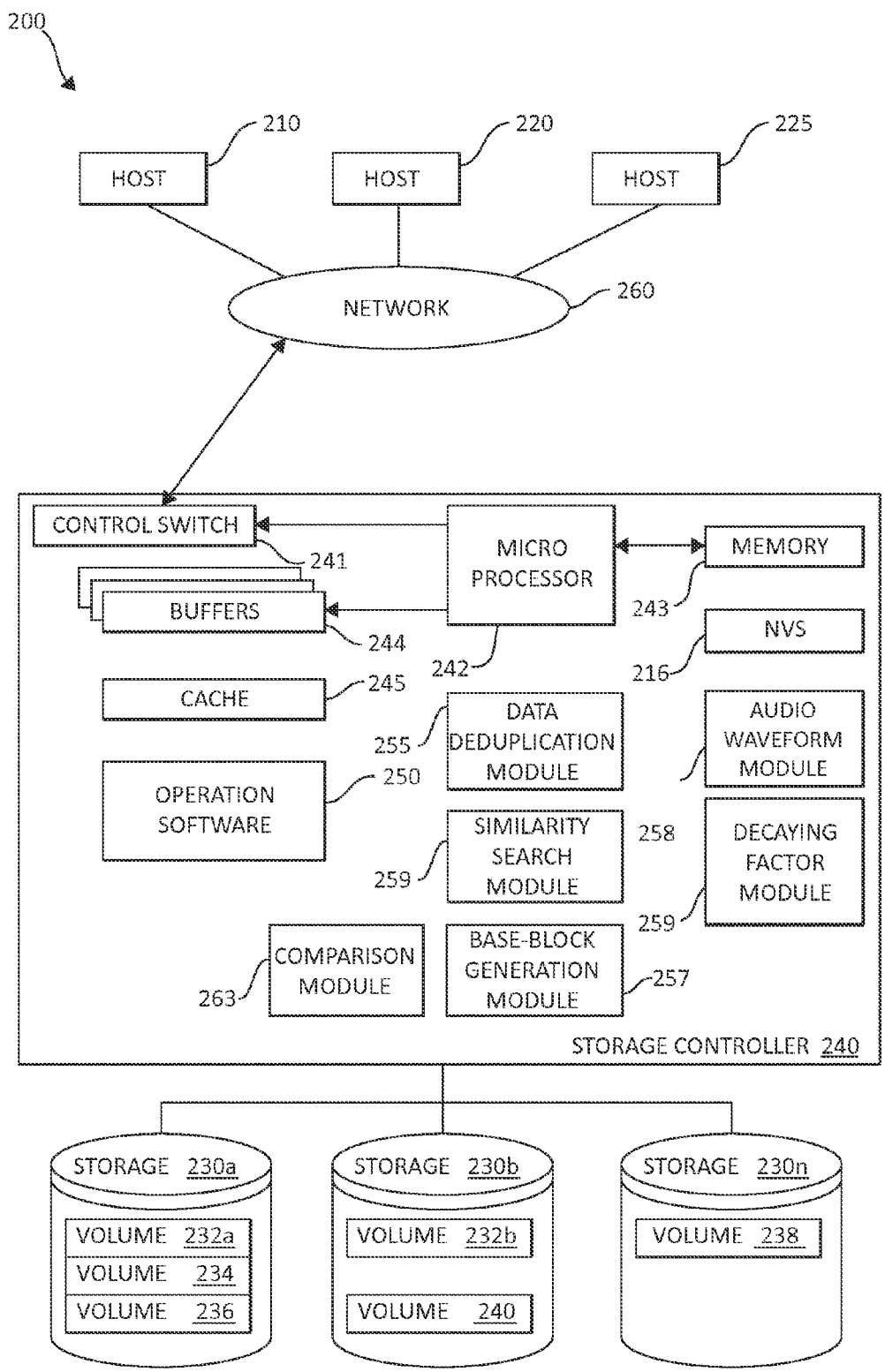
FIG. 2 is an exemplary block diagram showing a hardware structure of a data storage system in a computer system according to the present invention in which aspects of the present invention may be realized.

FIG. 2 is an exemplary block diagram 200 showing a hardware structure of a data storage and deduplication system that may be used in the overall context of performing video deduplication functionality. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™, although one of ordinary skill in the art will recognize that a variety of deduplication hardware and software, separately or in combination, may be utilized to implement the video deduplication functionality according to aspects of the illustrated embodiments. Moreover, it should be noted that particular deduplication system hardware and software may be useful in one embodiment, and thereby selected by one of ordinary skill in the art, where the recognition of two video streams having individual (differing) encoding codecs as the same video is desired.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, a base-block generation module 257, a waveform module 258, a similarity search module 259, and a comparison module 263. The data deduplication module 255, base-block generation module 257, waveform module 258, similarity search module 259, and comparison module 263 may work in conjunction with each and every component of the storage controller 240, the hosts 210, 220, 225, and storage devices 230. The data deduplication module 255, base-block generation module 257, waveform module 258, similarity search module 259, and comparison module 263 may be structurally one complete module or may be associated and/or included with other individual modules. The data deduplication module 255, base-block generation module 257, waveform module 258, similarity search module 259, and comparison module 263 may also be located in the cache 245 or other components.

The data deduplication module 255, base-block generation module 257, waveform module 258, similarity search module 259, and comparison module 263 may individually and/or collectively perform various aspects of the present invention as will be further described. For example, the data deduplication module 255 may perform various data deduplication tasks such as file deletion or joining together file segments. The base-block generation module 257 may produce base-block data segments that are later compared with other base-block data segments. Audio waveform module 258 may generate and/or compare generated audio waveforms that are sampled from audio data associated with a particular video stream. Similarity search module 259 may search among various previously produced base-blocks for similarity between those base-blocks and an instantly produced base-block. Finally, the comparison module may compare aspects of base-blocks such as the value associated with a number of coordinate points in a video stream at an instant in time.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the base-block generation module 257, the audio waveform module 258, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
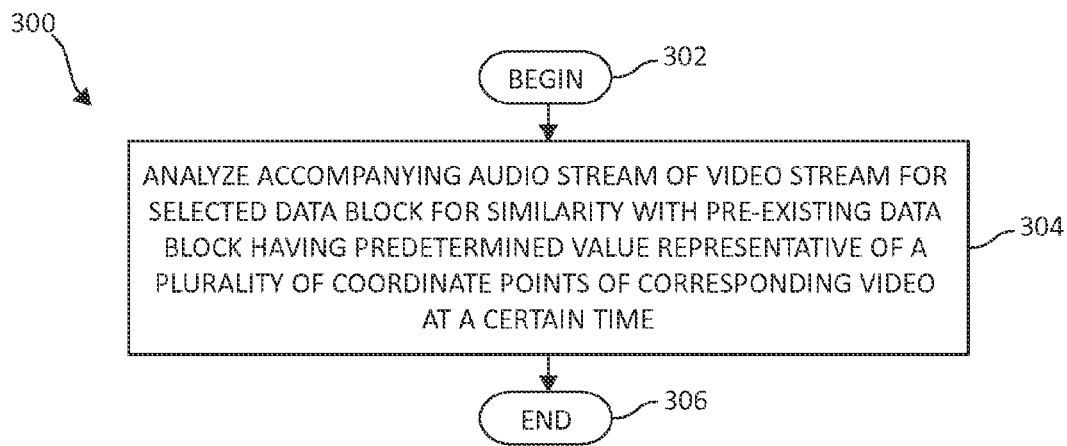
FIG. 3 is a flow chart diagram illustrating an exemplary method for effecting video deduplication, again in which aspects of the present invention may be realized.

Turning now to FIG. 3, a flow chart diagram, illustrating an exemplary method 300 for efficiently effecting video deduplication, is depicted. Method 300 begins (step 302). An analysis of accompanying audio stream information for a particular video stream is undertaken. The analysis involves comparing a selected data block for similarity with a pre-existing data block. The data blocks each have predetermined values representative of a number of coordinate points of corresponding video at a certain point in time (step 304). The method 300 then ends (step 306).

Figure 4:
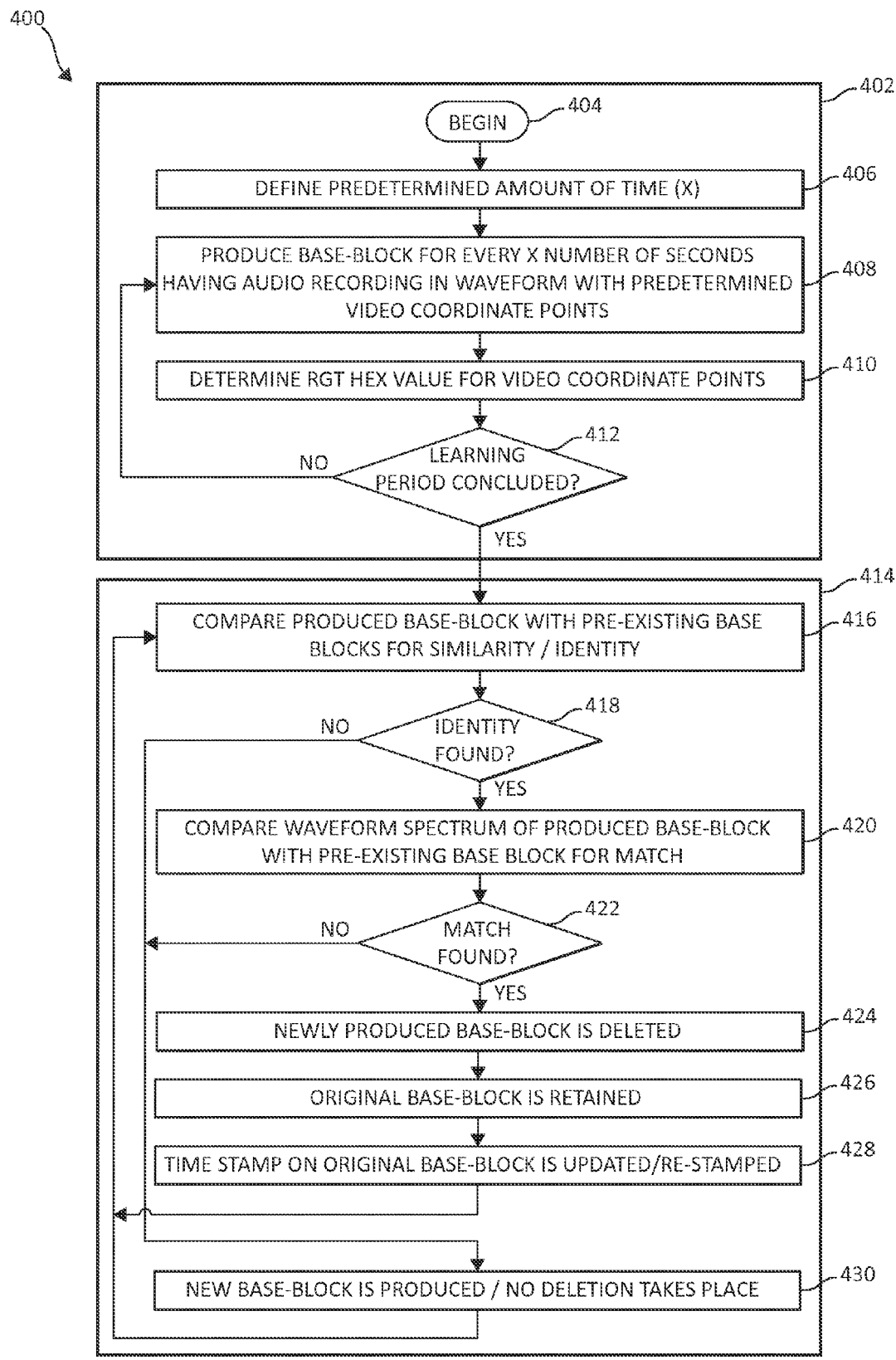
FIG. 4 is an additional flow chart diagram illustrating an additional exemplary method for effecting video deduplication, again in which aspects of the present invention may be implemented.

FIG. 4, following, is an additional flow chart diagram depicting an exemplary method 400 for effecting video deduplication in accordance with various aspects of the illustrated embodiments. Method 400 features an initial "learning period" 402 which, in one embodiment, allows for the setup for comparison purposes of base-blocks of data. Steps 404, 406, 408, 410, and 412 may be thought to correspond to this learning period, which may be configured to last for a predetermined time, such as 24 hours.

Method 400 begins (step 404) as a predetermined (X) amount of time is defined (step 406). This predetermined time is then used to produce a base-block corresponding to each X amount of time that passes (step 408). Accordingly, for each X seconds (e.g., 1 second), a particular base-block of a particular video stream may be produced. In one embodiment, this base-block may incorporate an audio recording in waveform with an accompanying number of predetermined (e.g., 7) corresponding coordinate points of video, as well as a timestamp associated with the time that the particular base-block was produced.

The predetermined points, in one embodiment, have associated coordinates within the video content, that may include, for example, their location within the base-block, a time stamp for the time which that coordinate existed, and an RGB hex value associated with what is found at that pixel's coordinates in the video stream that is calculated from the coordinate values (step 410). If the learning period is concluded (step 412), the method moves to a second, operational period 414, which is inclusive of steps 416-430, following. If the learning period is not concluded (again, step 412), the method 400 returns to step 408).

Turning now to step 416, to begin the operational stage 414, with every base-block that is produced, the produced base-block is quickly compared to one another to check for an identity by way of comparison of the coordinate/hex points previously described. When a match occurs (step 418), the mechanisms of the illustrated embodiments may then compare the spectrums of known waveform (step 420). If a match is found (step 422), then the newly produced base-block is deleted (step 424), the original base-block is retained (step 426), and the time stamp on the original base-block is updated/re-stamped (step 428). The method 400 then returns to step 416 to work with a newly produced base-block in the same fashion.

Alternatively, returning to step 418, if a match is not found, the new (instant) base-block is produced, and no deletion takes place (step 430). The method 400 then returns to step 416.

Figure 5:
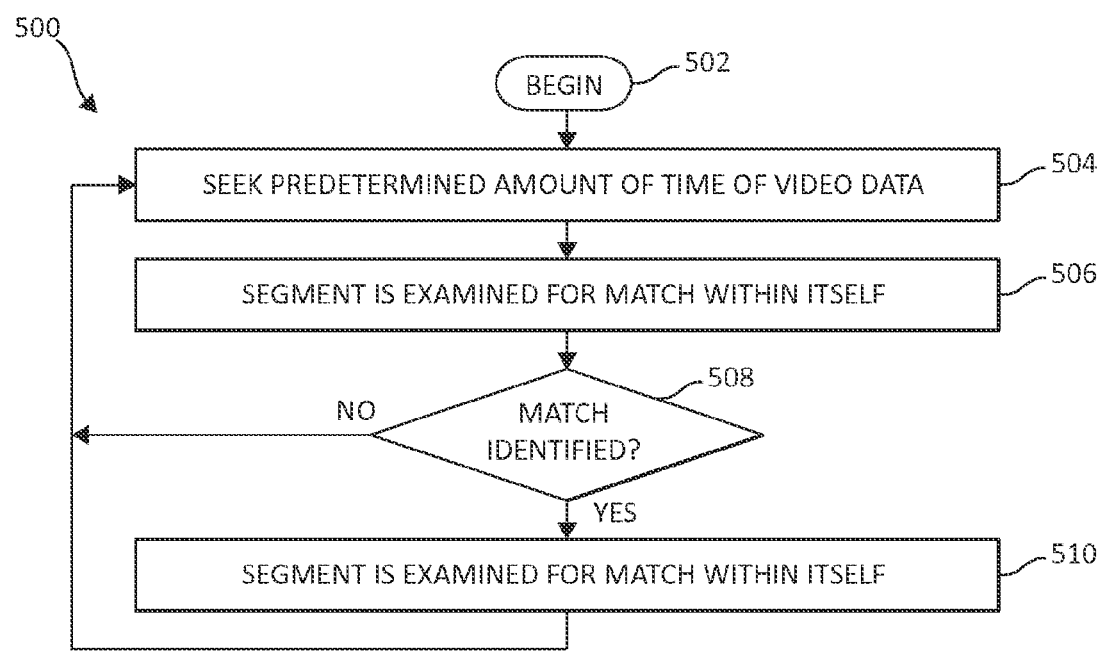
FIG. 5 is an additional flow chart diagram illustrating an additional exemplary method for effecting video deduplication, here again in which aspects of the present invention may be implemented.

Turning now to FIG. 5, following, a flow chart of an additional exemplary embodiment of effecting video deduplication is illustrated, here to show video data deduplication performed in real time, subsequent to the initial learning and operational periods shown previously in FIGS. 3 and 4.

Method 500 begins (step 502) by seeking a predetermined amount of video data (e.g., 5 seconds) to determine if the associated coordinate points in any way match what is to come (step 504). The segment (e.g., 5 second window) will be examined not for a direct match to the X-second base-block described previously, but for a match within itself (step 506) (i.e., does the 5 second window contain that block at all within it).

If any portion of the block is located (i.e., 4 seconds of the 5 second window/segment) (step 508), that relevant portion of the matching block is removed, and the remaining video is rejoined together appropriately, such that the user does not notice a change in video presentation (step 510). The method 500 then returns to step 504 to seek an additional amount of video data.

In one embodiment, base-blocks may be configured with an expiration option that, in one embodiment, may be based on the user's or, in an additional embodiment, administrator's, preferences. For example, those base-blocks that are found to be unused after a certain amount of time (e.g., 3 months) may be automatically removed. This option may allow for non deduplicated content to expire regularly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for performing video data deduplication by a processor device, comprising:
   analyzing an accompanying audio stream of a video stream for a selected data block for similarity with a pre-existing data block having a predetermined value representative of a plurality of coordinate points including an RGB (red, green, blue) hex value associated with pixel coordinates of corresponding video at a certain time, to locate and reduce certain redundant data in the video stream; and
   initiating a learning period of a first predetermined amount of time thereby generating the pre-existing data block by sampling the video stream for a second predetermined amount of time within the first predetermined amount of time.

2. The method of claim 1, wherein if the similarity is identified, the selected data block is deleted.

3. The method of claim 2, further including updating a timestamp of the pre-existing data block.

4. The method of claim 1, wherein if the similarity is not identified, the selected data block is retained.

5. The method of claim 1, wherein analyzing the accompanying audio stream of the video stream for the selected data block further includes performing at least one of:
   examining the plurality of coordinate points of the pre-existing data block with a plurality of additional coordinate points of the selected data block, and
   examining a spectrum waveform of the pre-existing data block with a spectrum waveform of the selected data block.

6. The method of claim 1, wherein generating the pre-existing data block further includes at least one of:
   generating a spectrum waveform of the pre-existing data block of the accompanying audio stream,
   generating the predetermined value as a representation of the plurality of coordinate points, and
   generating a time stamp corresponding to a time the pre-existing data block was generated.

7. A system for performing video data deduplication, comprising:
   a processor device that analyzes an accompanying audio stream of a video stream for a selected data block for similarity with a pre-existing data block having a predetermined value representative of a plurality of coordinate points including an RGB (red, green, blue) hex value associated with pixel coordinates of corresponding video at a certain time, to locate and reduce certain redundant data in the video stream; and
   initiates a learning period of a first predetermined amount of time thereby generating the pre-existing data block by sampling the video stream for a second predetermined amount of time within the first predetermined amount of time.

8. The system of claim 7, wherein if the similarity is identified, the selected data block is deleted.

9. The system of claim 8, wherein the processor device updates a timestamp of the pre-existing data block.

10. The system of claim 7, wherein if the similarity is not identified, the selected data block is retained.

11. The system of claim 7, wherein the processor device, pursuant to analyzing the accompanying audio stream of the video stream for the selected data block, performs at least one of:
    examines the plurality of coordinate points of the pre-existing data block with a plurality of additional coordinate points of the selected data block, and
    examines a spectrum waveform of the pre-existing data block with a spectrum waveform of the selected data block.

12. The system of claim 7, wherein the processor device, pursuant to generating the pre-existing data block, at least one of:
    generates a spectrum waveform of the pre-existing data block of the accompanying audio stream,
    generates the predetermined value as a representation of the plurality of coordinate points, and
    generates a time stamp corresponding to a time the pre-existing data block was generated.

13. A computer program product for performing video deduplication by a processor device, the computer program product comprising a non-transitory computer-readable storage medium having computer-readable program code portions stored therein, the computer-readable program code portions comprising:
    a first executable portion that analyzes an accompanying audio stream of a video stream for a selected data block for similarity with a pre-existing data block having a predetermined value representative of a plurality of coordinate points including an RGB (red, green, blue) hex value associated with pixel coordinates of corresponding video at a certain time, to locate and reduce certain redundant data in the video stream; and initiates a learning period of a first predetermined amount of time thereby generating the pre-existing data block by sampling the video stream for a second predetermined amount of time within the first predetermined amount of time.

14. The computer program product of claim 13, wherein if the similarity is identified, the selected data block is deleted.

15. The computer program product of claim 14, further including a second executable portion that updates a timestamp of the pre-existing data block.

16. The computer program product of claim 13, wherein if the similarity is not identified, the selected data block is retained.

17. The computer program product of claim 13, further including a second executable portion that, pursuant to analyzing the accompanying audio stream of the video stream for the selected data block, performs at least one of:

examines the plurality of coordinate points of the pre-existing data block with a plurality of additional coordinate points of the selected data block, and examines a spectrum waveform of the pre-existing data block with a spectrum waveform of the selected data block.

18. The computer program product of claim 13, further including a second executable portion that, pursuant to generating the pre-existing data block, at least one of:

generates a spectrum waveform of the pre-existing data block of the accompanying audio stream, generates the predetermined value as a representation of the plurality of coordinate points, and generates a time stamp corresponding to a time the pre-existing data block was generated.

* * * * *